Sept. 16, 1941.  J. H. MURCH  2,255,802
CONTAINER
Filed Sept. 24, 1936
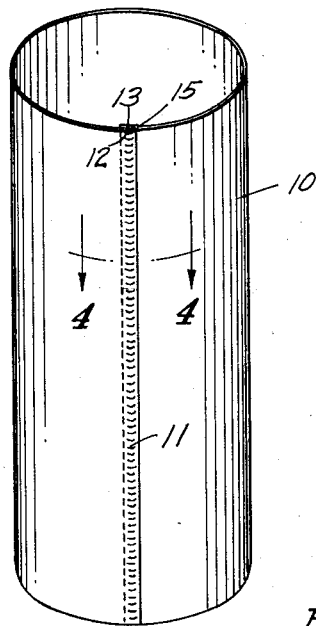
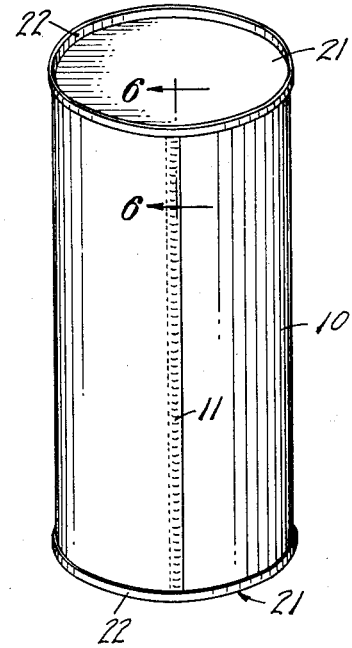
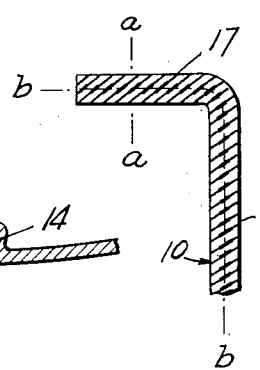
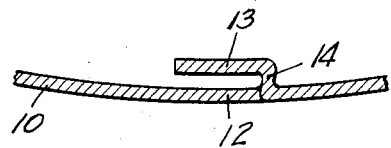
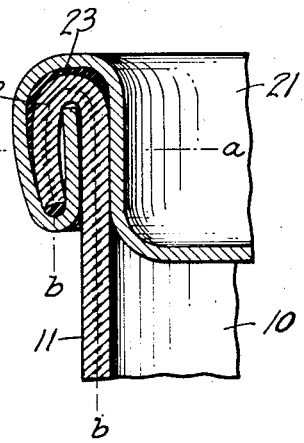
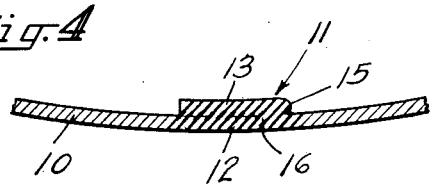
INVENTOR
John H. Murch
BY
ATTORNEYS Patented Sept. 16, 1941

2,255,802

UNITED STATES PATENT OFFICE 2,255,802

CONTAINER

John H. Murch, East Orange, N. J., assignor to American Can Company, New York, N. Y., a corporation of New Jersey Application September 24, 1936, Serial No. 102,408

1 Claim. (Cl. 220—75)

The present invention relates to metal containers or cans and to metal can bodies, and has particular reference to a continuous stitch weld construction in the side seam, which seam is created by the welding together of a straight wall part and an offset wall section which are crowded together at one stage in its manufacture to provide both an overlapped and a butted welded seam which seam is without extrusion of metal at its ends.

The present invention is directed to the welding of the side seam of a cam body such as is disclosed in my pending application Serial Number 23,485, filed in the United States Patent Office May 25, 1935, on "Container," and is an improvement upon the invention there disclosed.

It has been found that a stronger and for some purposes a more desirable welded joint can be obtained where the blank which is formed into tubular shape to provide the can body has one of its side seam edges offset and wherein this offset section is squeezed together with the opposite seam edge or straight wall part of the blank during the welding operation so that there results in addition to a lapping of the joint, a closely crowded engagement between the terminal raw edge of the straight wall part of the blank in the side seam zone and a pocket formed in the offset wall section of the blank. The resulting butted and lapped construction possesses a number of merits including an improved sizing of the body, ease of manufacture, etc.

The welding of this offset form of side seam, like that fully disclosed in my pending application previously mentioned, is effected without extrusion of projecting metal at the ends of the side seam and an object of the present invention, therefore, is the provision of a metal can or can body of relatively light gauge sheet material having a welded side seam wherein the end-engaged elements of the seam are secured together in an intimate and permanent union by means of a series of stitch or spot welds and wherein the side seam includes an offset section, the end spots or stitches of the welded seam being placed relative to the ends of the seam so that the effective welding heat and the effective welding pressure at the seam ends during the welding operation will not cause any metal extrusion of the welded seam parts but will at the same time cause the sections entering into the welded seam to be fully united.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a can body having a welded side seam and embodying the present invention;

Fig. 2 is a perspective view of a sealed can having such a body construction;

Fig. 3 is an enlarged sectional detail of the associated parts of the body sections which enter into the side seam, this view showing the offset construction of one of the sections;

Fig. 4 is a view similar to Fig. 3 showing the seam sections after they have been united in the welded side seam the view being a transverse section taken along the line 4—4 in Fig. 1;

Fig. 5 is a longitudinal sectional view of the upper end of a welded can body which has been flanged preparatory to uniting it with a can end or cover, the section being taken along the welded side seam; and Fig. 6 is a sectional detail of one end of the completely formed can drawn to the same scale as Figs. 3, 4 and 5 and showing the position of an end of the welded side seam within the double seam joint formed between the can body and its cover, this view being a section taken along the line 6—6 in Fig. 2.

A welded side seam can suitable for holding beer or pasteurized liquids which develop internal can pressure has been disclosed in the drawing as an exemplification of the invention. For such a can a thoroughly tight and strong side seam is absolutely necessary. This can as here shown includes a tubular body and can ends and may be formed of metal such as black iron which may be lined inside with a suitable protective coating. The outside of the can may also be coated with a rust resistant or a lithographic display or other form of coating. Such coatings form no part of the present invention and will not be further described.

A tubular can body 10 (Fig. 1) is formed with an overlapped and butted welded side seam 11. This side seam is composed of a series of welded stitches or spots which are produced by the resistance welding method. The center line of the end spot at one end of the seam is indicated by the broken line a—a (Figs 5 and 6) and each end spot of the seam is located a definite distance from the end of the body as is fully set forth in my companion application. The broken line b—b in those figures indicates the line of junction of the overlapped parts of the welded seam.

When the welding heat is first applied to the overlapped and butted parts of the seam 11 of the body to produce the side seam of the instant invention, this welding heat is concentrated at the first stitch weld (on the center line a—a, Figs. 5 and 6) and the concentrated pressure of welding is greatest at that particular place. Such welding heat gradually spreads in all directions but at the moment of welding, the pressure on either side of the center line a—a is necessarily less than at the concentrated line of weld. In fact, the pressure away from such a line may be said to be the result of the stiffness of the plate used in the seam parts and is proportionally less as to the distance from the stitch.

This first weld stitch therefore is spaced inwardly from the end of the seam just that amount which will give the effective welding heat and pressure at the terminal edge of the end of the seam that will produce the proper union of the seam parts but will not cause any extrusion of the metal. In the same way the last end stitch weld is spaced inwardly from the seam and edge to produce the same results.

The side seam 11 of the tubular body (illustrated in Figs. 1 and 4) is obtained by union of the opposite edges of the body blank from which the body is formed. These blank sections may be composed of a straight edge section 12 (Fig. 3) and an offset edge part 13, the latter being joined with the adjacent wall of the body blank in a right angled connecting web 14.

The terminal or raw edge of the straight section 12 of the blank is butted against the corner of the connecting web 14, as illustrated in Fig. 3, preparatory to forming the side seam by the welding operation. In this preparatory position of the parts the offset edge part 13 is spaced inwardly from the straight section 12 of the body blank a suitable distance which as herein shown may be substantially equal to the thickness of the metal which constitutes the body wall.

The seam joint is formed by the combination of welding pressure and heat and simultaneously with or just prior to the application of the latter the offset edge part 13 is crowded down in engagement with the straight section 12. During this crowding action the web 14 is mushroomed or crushed together as indicated at 15 in Fig. 4. This crushing of the web 14 changes its dimensions by making it shorter and wider and causes the part of the web which engages with the raw edge of the straight section 12 of the seam to be crowded over against the latter. This effects a great increase of pressure between the engaged parts and causes an extremely tight fitting together in the zone marked 16 in Fig. 4.

This mushrooming and crowding action of the seam sections takes place simultaneously with the welding operation and it is while the parts are so crushed together that sufficient fusion of the metal takes place to provide the welded joint.

This offset construction of side seam results in a strong welded bond between the engaged parts. It also provides for a certain sizing action for the tubular body 10. This is by reason of the sizing action being more or less accurately defined by the raw edge of the straight seam section 12 as it more firmly abuts against the crushed offset section. Owing to the improved clamping of the parts together during the welding action, the gauging of these parts is greatly simplified.

After a can body 10 has been produced with its completed side seam one or both ends of the body are flanged in the usual way as at 17 (Fig. 5). The end stitch a—a being relatively close to the end of the body is contained within the flange 17.

The flanged body is then provided at one or at each end with a can cover or can end 21 and the end flanges and the flanges of the body are then interfolded and united in the usual double seam joint 22 as shown in Figs. 2 and 6. Where a hermetic can is desired a gasket or lining compound 23 is also interfolded in the double seam in the usual manner.

It will be observed that the end stitch of the welded side seam is fully confined within the double seam 22 of the finished can and this construction provides a can having maximum strength. The welded side seam is fully as strong or stronger than any of the can wall and furthermore the can is accurately sized as has already been mentioned.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A metallic can body, comprising a blank formed of relatively thin sheet metal having two opposed marginal side edges, one of said edges being straight and the other offset, forming a butt and lap engagement, the lap portions of said edges being stitch welded and the part connecting said offset edge with the body being mushroomed into close engagement with the other edge of said blank with said mushroomed part of increased thickness within the seam to close all existing spaces at said seam, the outermost of said spot welds having the boundaries of their fused areas terminating at the end edges of said body and with said fused areas fully contained therein.

JOHN H. MURCH.